Patented June 18, 1940

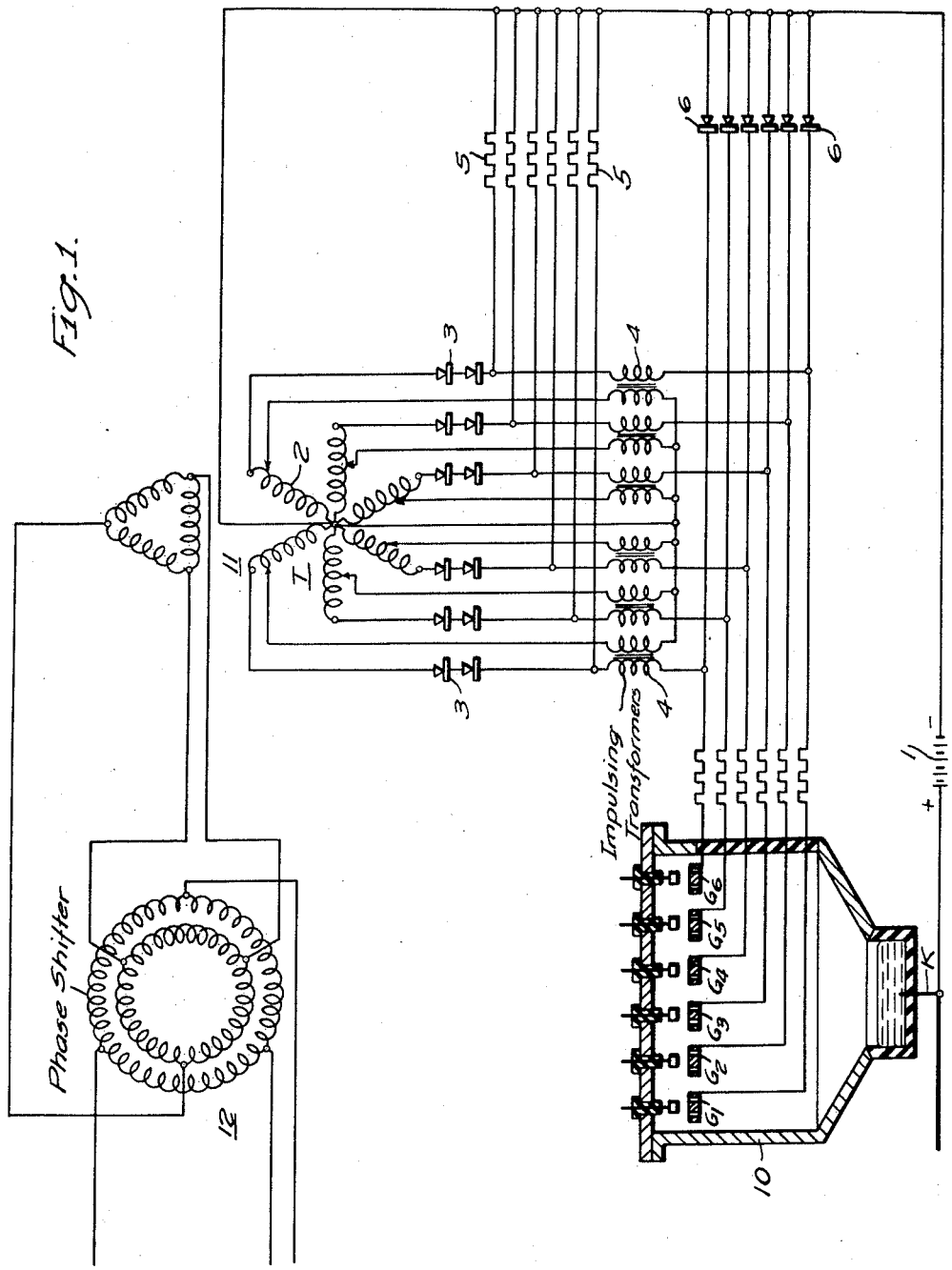

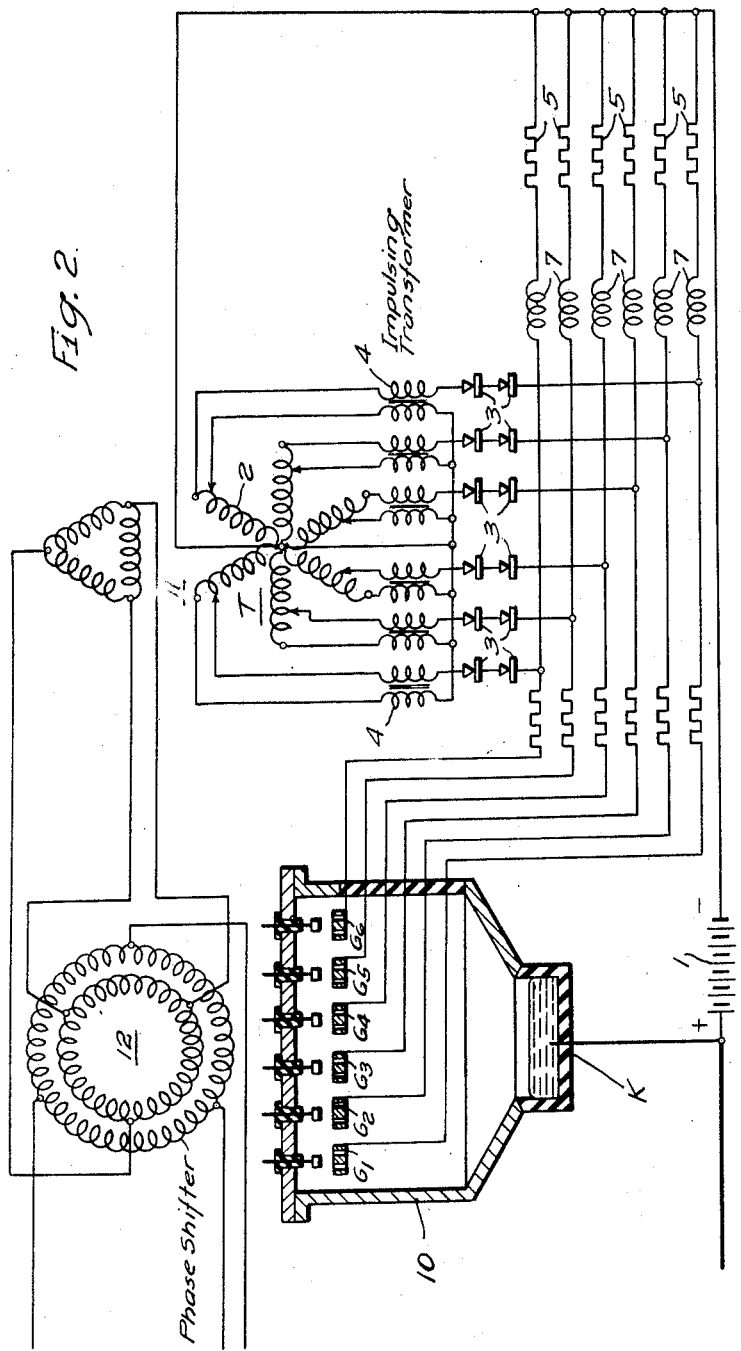

2,205,221

UNITED STATES PATENT OFFICE 2,205,221

ELECTRIC DISCHARGE DEVICE CONTROL SYSTEM

Karl Seethaler, Berlin-Siemensstadt, Germany, assignor to Westinghouse Electric & Manufacturing Company, East Pittsburgh, Pa., a corporation of Pennsylvania Application August 28, 1937, Serial No. 161,498
In Germany June 20, 1936

2 Claims. (Cl. 250—27)

My invention relates to a control system for converters and particularly to an arrangement for controlling the moment of starting of converters, such as rectifiers, inverters or static frequency changers in which controllable gas or vapor discharge devices with arc-like discharge, particularly grid-controlled mercury vapor discharge devices are employed for the conversion. For controlling the moment of starting of the discharge devices a control voltage is employed according to the invention which is formed by the superposition of a somewhat sinusoidal voltage and of a voltage of a pointed wave shape. The invention has the advantage over the known control devices that the control voltage presents a sudden increase when passing from the negative to the positive values, but that the duration of the positive control impulse may be adapted to a great extent to the duration of ignition of the corresponding discharge device to be controlled. This property of the control arrangement is of great importance for converters of a considerable output. The invention has the advantage over the known control arrangements which have also this property that only a few and simple apparatus are necessary in the control circuit. As far as auxiliary rectifiers are necessary, simple dry rectifiers may be employed.

Figs. 1 and 2 of the accompanying drawings show two embodiments of my invention. Fig. 3 shows the curve form of the control voltage. For the sake of simplicity only the wires essential to the control are indicated in the connections according to Figs. 1 and 2.

In Fig. 1, $G_1$ to $G_6$ denote the control grids of a mercury vapor rectifier 10 and K denotes the cathode thereof. T is the secondary winding of a grid transformer 11 which is connected to an induction voltage regulator 12 or other device for varying the phase position of an alternating voltage. From the control circuit indicated for the control grid $G_1$ results that between the cathode K of the discharge device and the control grid a bias voltage source 1, a phase winding 2 of the grid transformer T, a dry rectifier 3 and an auxiliary transformer 4 are connected in series. The auxiliary transformer 4 produces in a known manner a voltage of a pointed wave-shape and may be for this reason denoted as a peaking transformer. Further, a resistance 5 is connected in parallel relation to the transformer winding 2 and the rectifier 3, and furthermore a rectifier 6 is parallel-connected to the transformer 4. In this form of invention the peaking transformer 4 lies outside the circuit of the grid transformer formed by the winding 2, the rectifier 3 and the resistor 5. The rectifier 6 which is parallel-connected to the peaking transformer causes only the positive voltage peaks of this transformer to become effective. The rectifier 3 serves the same purpose for the grid transformer T.

In the form of the invention shown in Fig. 2 each of the control grids $G_1$ to $G_6$ are connected to the cathode K of the discharge device through a bias voltage source 1 and a resistor 5, the latter being fed with a phase variable alternating voltage through a rectifier 3 and one of the windings 2 of the grid transformer T. The peaking transformer 4 which superimposes the voltage of pointed wave shape on the sinusoidal voltage of the grid transformer lies in this connection in contradistinction to that shown in Fig. 1 in the circuit of the grid transformer. The negative half waves are cut off by the rectifier 3 in this circuit for the grid transformer as well as for the peaking transformer 4. In the circuit of the grid transformer a reactor 7 is further inserted which plays a useful part, since the peaking transformer may be effective in this connection in both directions.

Fig. 3 shows the curve shape of the control voltage which is obtained in connection with the wiring diagrams shown in Figs. 1 and 2. A voltage of pointed wave shape 9 is superimposed upon a sinusoidal alternating voltage 8. The displacement with respect to the zero line, i. e., with respect to the potential of the cathode of the discharge device to be controlled may be effected by the bias voltage source 1. As a rule, it is advisable to employ this bias voltage source; however, it may be also dispensed with if particularly simple control arrangements are to be employed. The negative half wave of the alternating voltage of the grid transformer takes over in this case the inverse voltage of the discharge devices to be controlled.

In the embodiments of the invention shown in the drawings it has been assumed that a peaking transformer, i. e., a saturated transformer with direct-current bias be employed for producing a voltage of pointed wave shape. Instead of this transformer also other known means may be employed by which a voltage of a given curve shape is converted in a voltage of pointed wave shape. In the case of control arrangements for converters of considerable output it is essential that the apparatus producing the voltage of pointed wave shape supply a sufficient power to the control circuit.

I claim as my invention:

1. A grid control system for controlling the moment of starting of a grid controlled arc-discharge device comprising in series between the cathode and the grid of the grid controlled arc-discharge device a bias voltage source, an alternating current grid transformer for supplying a potential having a substantially sinusoidal wave form, a rectifying device and a peaking transformer, a resistance connected in parallel with said alternating current grid transformer and said rectifying device and a further rectifying device connected in parallel with said resistance and said peaking transformer.

2. A grid control system for controlling the moment of starting of a grid controlled arc-discharge device comprising in series between the cathode and the grid of the grid controlled arc-discharge device a bias voltage source, an alternating current grid transformer for supplying a control potential having a substantially sinusoidal wave form, a rectifying device and a peaking transformer, and an impedance connected in parallel with said alternating current grid transformer and said rectifying device.

KARL SEETHALER.